United States Patent
Popovski et al.

(10) Patent No.: US 8,060,802 B2
(45) Date of Patent: Nov. 15, 2011

(54) AUTOMATIC REPEAT REQUEST (ARQ) APPARATUS AND METHOD OF MULTIPLE INPUT MULTIPLE OUTPUT (MIMO) SYSTEM

(75) Inventors: Petar Popovski, Aalborg (DK);
Hiroyuki Yomo, Aalborg (DK);
Elisabeth De Carvalho, Aalborg (DK);
Seung-Hoon Park, Seoul (KR); David Mazzarese, Suwon-si (KR); Marcos Daniel Katz, Suwon-si (KR);
Dong-Seek Park, Yongin-si (KR);
Sung-Kwon Hong, Seoul (KR); Hak-Ju Lee, Incheon (KR)

(73) Assignee: Samsung Electronics Co., Ltd (KR)

( * ) Notice: Subject to any disclaimer, the term of this patent is extended or adjusted under 35 U.S.C. 154(b) by 1298 days.

(21) Appl. No.: 11/710,854

(22) Filed: Feb. 26, 2007

(65) Prior Publication Data
US 2007/0245205 A1 Oct. 18, 2007

(30) Foreign Application Priority Data
Feb. 24, 2006 (KR) .............................. 2006-0018022

(51) Int. Cl.
*H04L 1/18* (2006.01)
(52) U.S. Cl. .................... 714/751; 714/749; 714/758
(58) Field of Classification Search .................. 714/751, 714/749, 750, 758, 763, 768, 799, 718, 704
See application file for complete search history.

(56) References Cited

U.S. PATENT DOCUMENTS

| | | | | |
|---|---|---|---|---|
| 7,440,399 B2 * | 10/2008 | Julian et al. | ................... | 370/230 |
| 7,684,329 B2 * | 3/2010 | Mohanty et al. | .............. | 370/232 |
| 7,719,991 B2 * | 5/2010 | Bhushan et al. | .............. | 370/252 |
| 2006/0136290 A1 * | 6/2006 | Fong | .............................. | 705/11 |
| 2006/0136790 A1 * | 6/2006 | Julian et al. | ................... | 714/704 |
| 2007/0147253 A1 * | 6/2007 | Sutivong et al. | ............. | 370/236 |

FOREIGN PATENT DOCUMENTS

| | | |
|---|---|---|
| KR | 2003-0095632 | 12/2003 |
| KR | 102006001619 | 2/2006 |
| KR | 1020060029061 | 4/2006 |
| WO | WO 2005-004376 | 1/2005 |

* cited by examiner

*Primary Examiner* — Fritz Alphonse
(74) *Attorney, Agent, or Firm* — The Farrell Law Firm, P.C.

(57) ABSTRACT

Automatic Repeat reQuest (ARQ) apparatus and method of a Multiple Input Multiple Output (MIMO system are provided. The ARQ method includes decoding, when one or more packets are received, the received packets and trying to detect the decoded packets; and storing, when error is detected from the packets, the corresponding error packet, requesting a transmitter to retransmit N-ary packets from which the error is detected and to transmit (M-N)-ary new packets when the number of the error packets N is smaller than the total number of the transmitted packets M. Accordingly, the error rate of the retransmitted data can be minimized, the number of retransmissions can be decreased, and the overall data transmission rate can be raised.

17 Claims, 8 Drawing Sheets

AUTOMATIC REPEAT REQUEST (ARQ) APPARATUS AND METHOD OF MULTIPLE INPUT MULTIPLE OUTPUT (MIMO) SYSTEM

PRIORITY

This application claims priority under 35 U.S.C. §119 to an application filed in the Korean Intellectual Property Office on Feb. 24, 2006 and assigned Serial No. 2006-18022, the contents of which are incorporated herein by reference.

BACKGROUND OF THE INVENTION

1. Field of the Invention

The present invention relates generally to a Multiple Input Multiple Output (MIMO) system, and in particular, to an Automatic Repeat reQuest (ARQ) apparatus and method.

2. Description of the Related Art

The next-generation wireless mobile communication system aims to provide a variety of data services beyond the existing voice oriented services. To this end, high-speed data communication technology needs to be further developed. Recent research has found that a Multiple Input Multiple Output (MIMO) system, which uses multiple antennas at transmitter and receiver respectively, achieves a remarkable increase in channel capacity, compared to a system using a single transmit antenna and a single receive antenna. To realize the theoretical channel capacity increase gain of the MIMO system, various schemes have been suggested, including a spatial multiplexing scheme and a space-time code scheme.

The spatial multiplexing scheme can increase system capacity, without requiring additional system bandwidth, by transmitting different data from different transmit antennas at the same time. A representative example of the spatial multiplexing scheme is Vertical-Bell Laboratory Layered Space Time (V-BLAST). The space-time coding scheme provides both diversity gain and coding gain by distributing and transmitting a data stream over time slots and an antenna with proper codes appended. A representative example of the space-time coding scheme is a space-time block coding scheme.

A 2×2 MIMO system can receive two data streams over one time slot by separately receiving the signals at a receiver from two transmit antennas. Also, the 2×2 MIMO system can obtain the diversity gain and lower the data error rate by distributing and transmitting two data streams over two antennas in two time slots using Alamouti's code.

FIG. 1 is a conceptual diagram of transmission and reception of a general 2×2 MIMO system.

In FIG. 1, 2×2 subchannels are established between a transmitter having two transmit antennas 101-1 and 101-2 and a receiver having two receive antennas 103-1 and 103-2. $X_i(t)$ is a packet signal transmitted to a transmit antenna i at time t, and $Y_j(t)$ is a signal received at a receive antenna j at the time t. $V_j(t)$ is white noise in the receive antenna j at the time t, and $\hat{X}_i(t)$ is a signal decoded from $X_i(t)$ through decoders 105-1 and 105-2 at the time t. The subchannels each have a unique channel response characteristic $h_{ji}$. This characteristic is a channel coefficient from the transmit antenna i to the receive antenna j and is represented as a channel characteristic matrix H. In case of the 2×2 MIMO system, the channel characteristic matrix H is $$\begin{bmatrix} h_{11} & h_{12} \\ h_{21} & h_{22} \end{bmatrix} \cdot \begin{bmatrix} h_{11} \\ h_{21} \end{bmatrix}$$

can be represented as H1 and $$\begin{bmatrix} h_{12} \\ h_{22} \end{bmatrix}$$

can be represented as H2. The relational expression of the transmission and reception of the system is $$\underline{Y}(t) = H\underline{X}(t) + \underline{V}(t),$$

where $$\underline{X}(t) \text{ is } \begin{bmatrix} X_1(t) \\ X_2(t) \end{bmatrix}, \underline{Y}(t) \text{ is } \begin{bmatrix} Y_1(t) \\ Y_2(t) \end{bmatrix}, \text{ and } \underline{V}(t) \text{ is } \begin{bmatrix} V_1(t) \\ V_2(t) \end{bmatrix}.$$

Automatic Repeat reQuest (ARQ) is a method for data retransmission from a transmitter when an error occurs in the received data in a communication system. Particularly, Hybrid ARQ (HARQ), which combines ARQ with encoding, combines the incorrectly received data stored in a previous time slot and the retransmitted data using a proper coding scheme. HARQ can reduce the number of data retransmissions and raise the data reception probability. Each packet is transmitted with a Cyclic Redundancy Check (CRC) code for the error detection.

The CRC appends extra error detection bits called a Frame Check Sequence (FCS) to the original data bits to increase the reliability of a data frame of a certain size. The FCS generation and the error detection are carried out using one polynomial circuit and is frequently used thanks to its easy implementation, good error detection, and low overhead. For instance, after passing through a polynomial circuit p(x)=x5+x4+x2+1 to acquire an FCS of message bits 1010001101 in a frame, the FCS 1110 is generated. By appending the generated FCS to the original message bits, 10100001101011110 can be transmitted over the channel. Upon receiving the message bits, error detection is performed using the same p(x) polynomial circuit.

In the conventional ARQ method, which is for a Single Input Single Output (SISO) system, the receiver determines the error based on the error detection bits of the received packet. When an error occurs, the receiver can send an Acknowledge/Negative Acknowledge (ACK/NACK) signal to the transmitter over the reverse channel. That is, the receiver sends an ACK signal when the error is not detected, and sends a NACK signal when the error is detected. Accordingly, the transmitter sends new packets when receiving the ACK signal and retransmits the packet when receiving the NACK signal.

When the ARQ method of the existing SISO system is applied to the MIMO system, the number of the transmission paths increases and the number of operation schemes also increases. Also, two or more data streams can be transmitted at the same time, and the reception error may be detected from both or either of the two data transmissions. Therefore, to apply the ARQ method of the existing SISO system to the MIMO system, a method for minimizing the retransmitted data error rate and decreasing the number of retransmissions using an adequate ARQ method is needed.

SUMMARY OF THE INVENTION

An aspect of the present invention is to substantially solve at least the above problems and/or disadvantages and to provide at least the advantages below. Accordingly, an aspect of the present invention is to provide an Automatic Repeat reQuest (ARQ) apparatus and method of a Multiple Input Multiple Output (MIMO) system.

The above aspects are achieved by providing an ARQ method which includes decoding, when one or more packets are received, the received packets and trying to detect the decoded packets; and storing, when error is detected from the packets, the corresponding error packet, requesting a transmitter to retransmit N-ary packets from which the error is detected and to transmit (M-N)-ary new packets when the number of the error packets N is smaller than the total number of the transmitted packets M.

According to one aspect of the present invention, an ARQ apparatus includes a receiver which decodes received packets when one or more packets are received, tries to detect the decoded packets, stores corresponding error packets when an error is detected from the packets, and requests retransmission of the corresponding error packets taking into account a number of the error packets and a retransmit antenna; and a transmitter which retransmits packets when receiving the retransmission request from the receiver.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an Automatic Repeat reQuest (ARQ) apparatus and method of a Multiple Input Multiple Output (MIMO) system. Herein, while the MIMO system is applicable every M×N MIMO system, a 2×2 MIMO system is illustrated by way of example.

Figure 1:
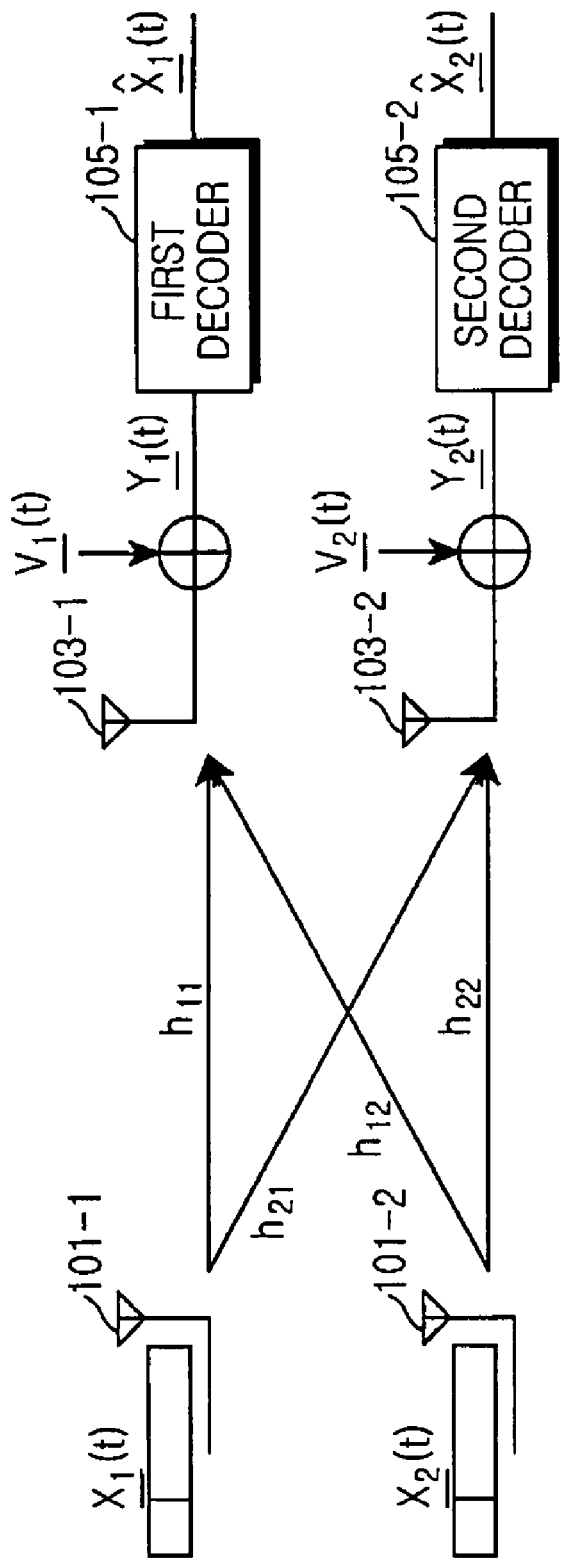
FIG. 1 is a conceptual diagram of transmission and reception in a general 2×2 MIMO system.
Figure 2:
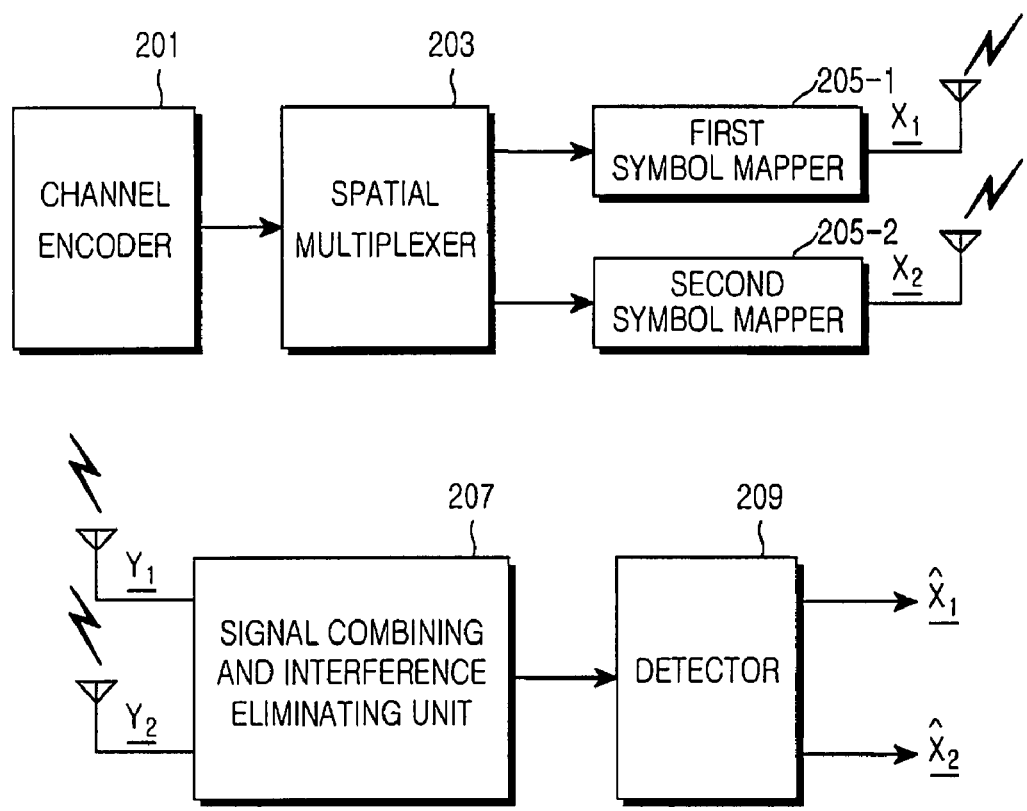
FIG. 2 is a block diagram of a transceiver in a MIMO system according to the present invention.

FIG. 2 is a block diagram of a transceiver in a MIMO system according to the present invention. The transceiver includes a channel encoder 201, a spatial multiplexer 203, first and second symbol mappers 205-1 and 205-2, a signal combining and interference eliminating unit 207, and a detector 209.

In FIG. 2, the channel encoder 201 receives and encodes traffic data (i.e., information bits) based on one or more encoding schemes to provide the encoded bits, and outputs the encoded data to the spatial multiplexer 203. The channel encoder 201 receives an Acknowledge/Negative Acknowledge (ACK/NACK) signal from the detector 209 over a reverse channel, and accordingly encodes and transmits new packets or encodes and retransmits the packet which was transmitted in a previous time slot. Also, the channel encoder 201 may receive a stream separation bit indicating in which stream the error occurs, together with the ACK/NACK bit, and then encodes and retransmits the corresponding stream. The encoding scheme raises the reliability of the data transmission. Herein, the encoding scheme can be selected based on feedback information received from the reception side. The encoding scheme can include random combinations of Forward Error Detection (FED) codes (e.g., Cyclic Redundancy Check (CRC) codes) and Forward Error Correction (FEC) codes (e.g., convolutional codes, turbo codes, and block codes).

The spatial multiplexer 203 distributes the encoded data to the plurality of the symbol mappers 205-1 and 205-2 corresponding to the respective transmit antennas. The first and second symbol mappers 205-1 and 205-2 generate a modulation symbol by mapping the input data using one or more modulation schemes such as Quadrature Phase Shift Keying (QPSK), 8PSK, 16Quadrature Amplitude Modulation (QAM), and 64QAM, and transmit the modulation symbol via the corresponding transmit antenna.

The signal combining and interference eliminating unit 207 combines data which is determined to be erroneous in a previous time slot using an adequate encoding scheme and then stores that data with the retransmitted data, and eliminates interference by separating a signal from a specific antenna using a pilot signal whose position is fixed depending on the antenna.

The detector 209 attempts to detect the input signal and requests transmission of new packets or retransmission of the error packet by sending an ACK/NACK signal to the channel encoder 201 over the reverse channel depending on the success or failure of the detection. That is, when there is no error, the detector 209 sends an ACK signal, and when there occurs error, the detector 209 sends a NACK signal. In addition to the ACK/NACK bit, the detector 209 feeds back a stream separation bit indicating in which stream the error occurs.

Figure 3:
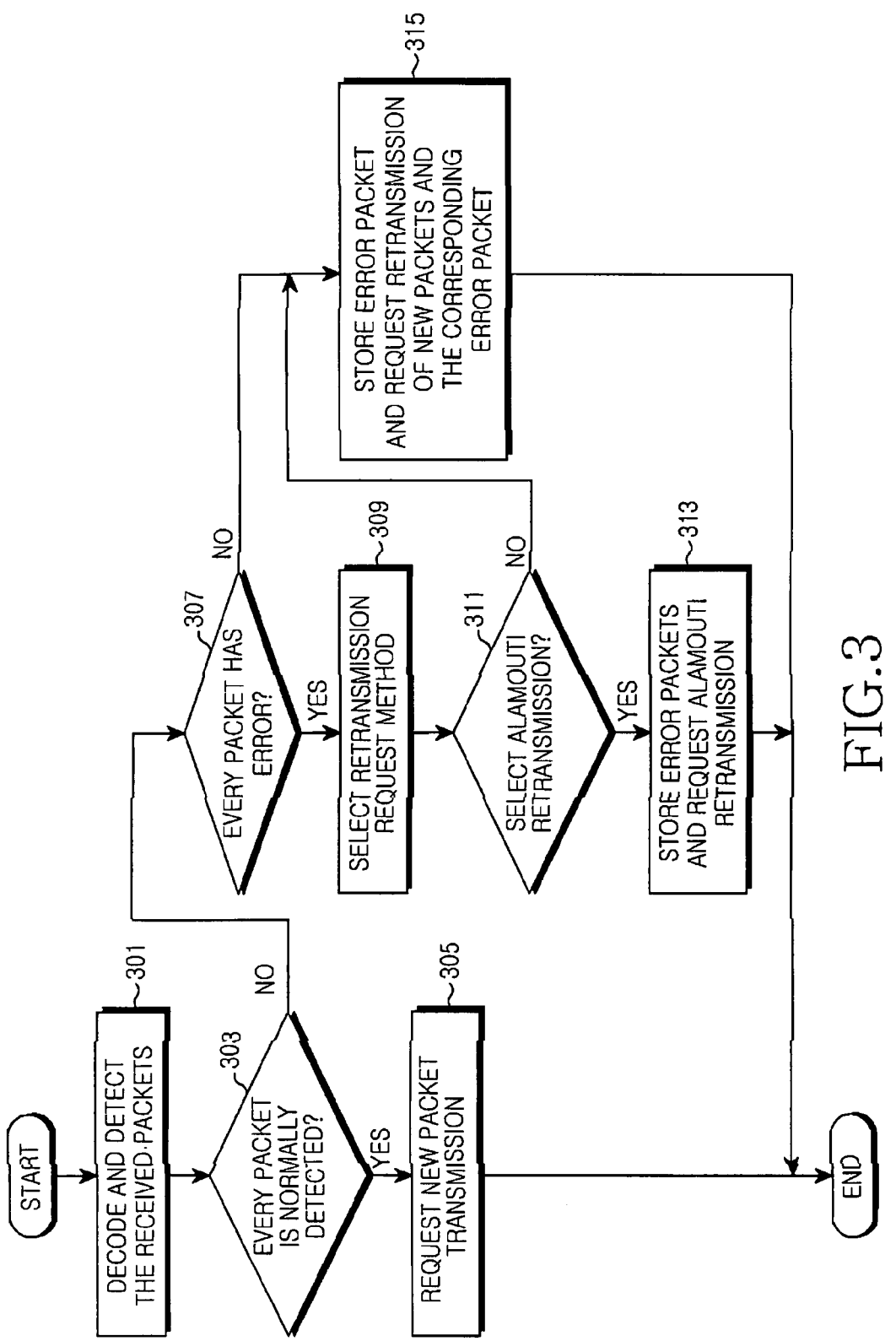
FIG. 3 is a flowchart outlining a retransmission method at the receiver of the MIMO system according to the present invention.

FIG. 3 is a flowchart outlining a retransmission method at a receiver of the MIMO system according to the present invention.

In FIG. 3, the receiver decodes a plurality of packets, e.g., two packets received over a plurality of transmit antennas, (for example, two transmit antennas), and attempts to detect the two packets using error detection bits of the decoded packets in step 301. In step 303, the receiver checks whether all of the two packets are normally detected.

When both of the two packets are normally detected in step 303, the receiver requests transmission of two new packets by sending an ACK signal to the transmitter over the reverse channel in step 305.

When either of the two packets are not normally detected in step 303, the receiver checks whether the error is detected from both of the two received packets in step 307. When the error is not detected from both of the two packets, the receiver determines one packet is erroneous, stores the corresponding error packet, and requests transmission of new packets and retransmission of the error packet by feeding back the NACK bit relating to the corresponding error packet and an antenna index for the retransmission to the transmitter through the reverse channel in step 315.

When the error is detected from both of the two received packets, the receiver selects a retransmission request method in step 309. Herein, the retransmission request method includes an Alamouti retransmission and a single packet retransmission. Next, in step 311, the receiver checks whether the selected retransmission request method is the Alamouti retransmission in step 311. When the Alamouti retransmission is selected, the receiver stores the two error packets and requests the Alamouti retransmission of the corresponding packets by feeding back an antenna index for the retransmission together with the NACK bit to the transmitter over the reverse channel in step 313. When the Alamouti retransmission is not selected, the receiver stores the two error packets and requests transmission of new packets and retransmission of the packets by feeding back an antenna index for the retransmission together with the NACK bit for one of the two error packets to the transmitter in the reverse channel in step 315. Next, the receiver terminates the process of the present invention.

Figure 4:
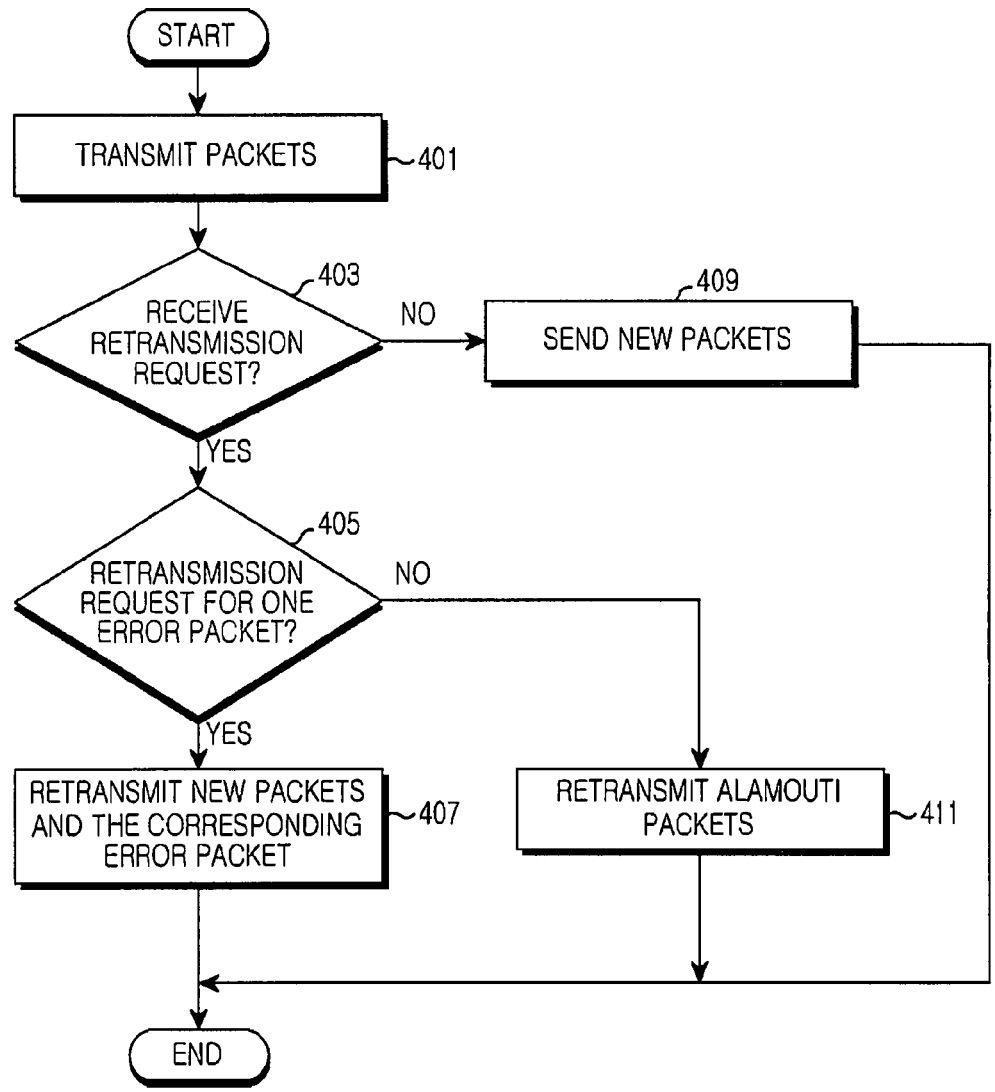
FIG. 4 is a flowchart outlining a retransmission method at the transmitter of the MIMO system according to the present invention.

FIG. 4 is a flowchart outlining a retransmission method at a transmitter of the MIMO system according to the present invention.

In FIG. 4, the transmitter transmits packets to the receiver in step 401 and checks whether a retransmission request is received from the receiver in step 403. That is, the transmitter checks whether a NACK bit and an antenna index to be retransmitted are received in the reverse channel. When the retransmission request is not received from the receiver, that is, when the ACK bit is received over the reverse channel, the transmitter sends new packets to the receiver in step 409 and then terminates the process of the present invention.

Upon receiving the retransmission request from the receiver, the transmitter checks which one of packets transmitted in a previous time slot is erroneous based on the retransmission request, and determines whether the retransmission of one error packet is requested in step 405. When the retransmission request pertains to one error packet, the transmitter sends new packets and retransmits the corresponding error packet in step 407. When the retransmission request is not related to one error packet; that is, when the Alamouti retransmission is requested, the transmitter retransmits Alamouti packets in step 411 and then terminates the process of the present invention.

Figure 5A:
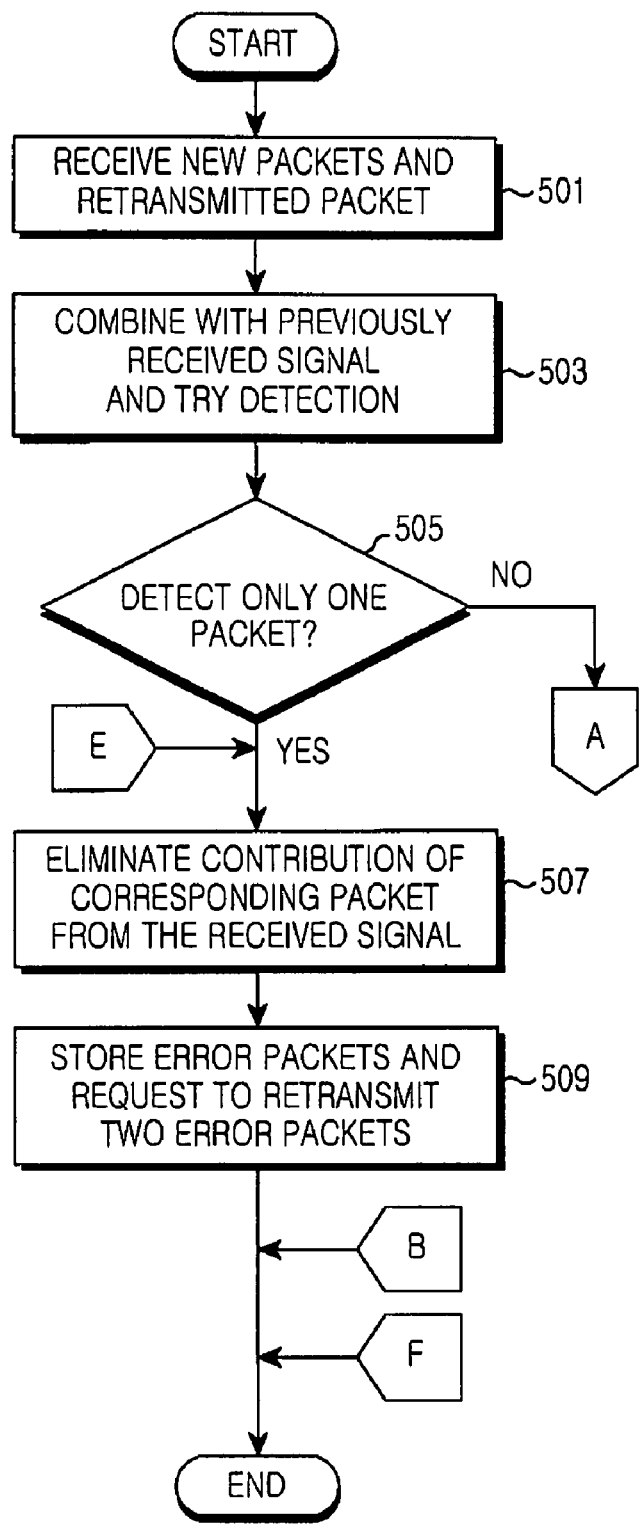
FIGS. 5A, 5B and 5C show a flowchart outlining a signal detection method through transmission of new packets and retransmission of one of two error packets when the two packets of a previously received signal are erroneous at the receiver in the MIMO system according to the present invention.
Figure 5B:
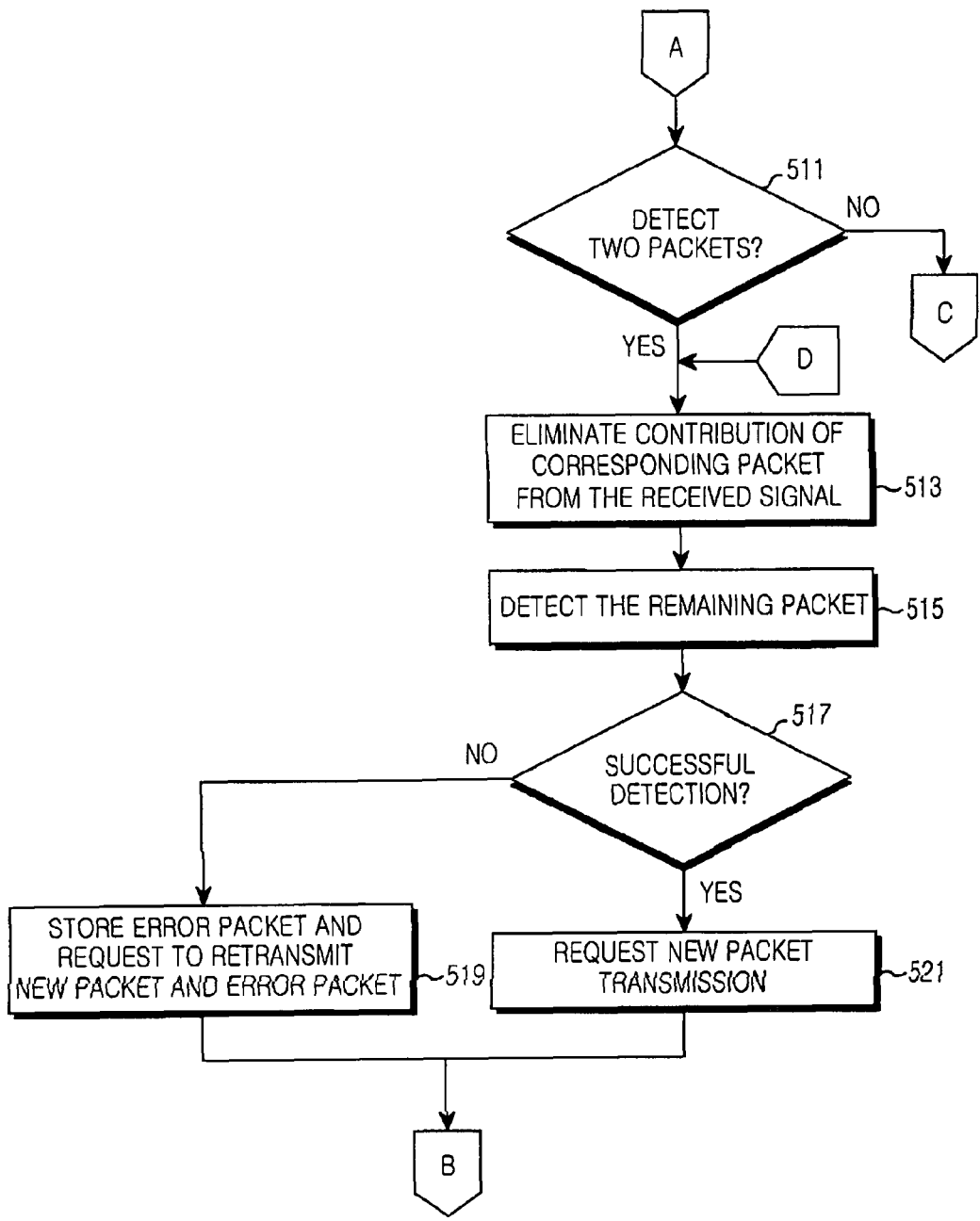
Figure 5C:
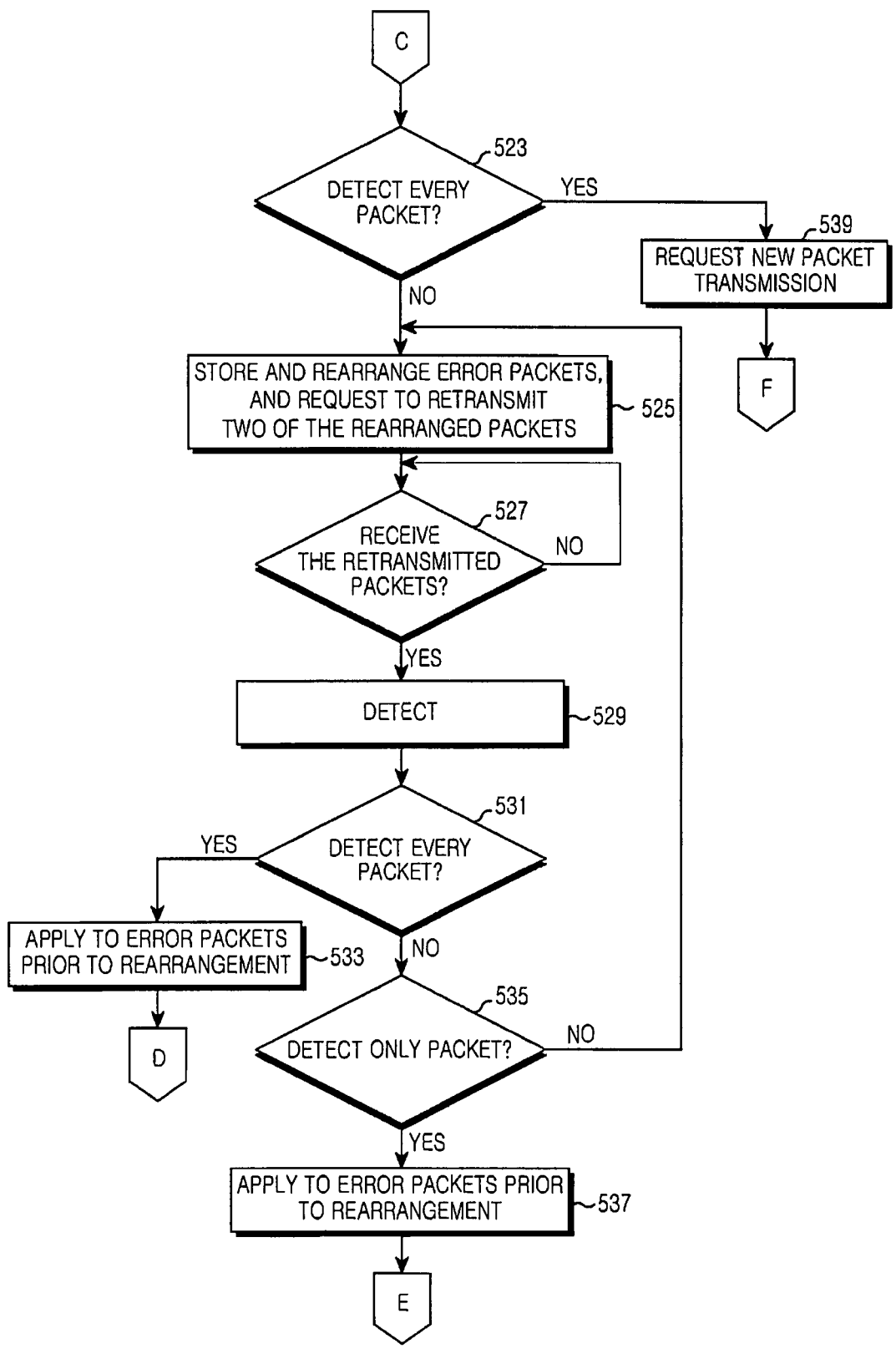

FIGS. 5A, 5B and 5C show a flowchart outlining a signal detection method through transmission of new packets and retransmission of one of two error packets when the two packets of a previously received signal are erroneous at the receiver in the MIMO system according to the present invention.

In FIGS. 5A, 5B and 5C, the receiver receives new packets and a retransmitted packet for one of error packets that are not detected from a previous time slot in step 501. Next, the receiver combines the received packets with the packets received in the previous time slot and then tries the detection in step 503.

For instance, if the error occurs at the entire packet $$\begin{bmatrix} X_1(t) \\ X_2(t) \end{bmatrix}$$

received in the previous time slot, the packets received in the next time slot may be $$\begin{bmatrix} X_1(t) \\ X_n(t+1) \end{bmatrix}, \begin{bmatrix} X_n(t+1) \\ X_1(t) \end{bmatrix}, \begin{bmatrix} X_2(t) \\ X_n(t+1) \end{bmatrix}, \text{ or } \begin{bmatrix} X_n(t+1) \\ X_2(t) \end{bmatrix}.$$

When the packets received in the next time slot are $$\begin{bmatrix} X_1(t) \\ X_n(t+1) \end{bmatrix};$$

that is, when $X_1(t)$ is retransmitted over an antenna 1 and $X_n(t+1)$ is transmitted over an antenna 2, the receiver can try to detect the two packets received in the previous time slot and the new packets by combining the packets received in the previous time slot with the packets received in the next time slot based on Equation (1).

$$\begin{bmatrix} Y_p(t) \\ Y(t+1) \end{bmatrix} = \begin{bmatrix} H_1 & H_2 & 0 \\ H_1 & 0 & H_2 \end{bmatrix} \begin{bmatrix} X_1(t) \\ X_2(t) \\ X_n(t+1) \end{bmatrix} + \begin{bmatrix} V(t) \\ V(t+1) \end{bmatrix} \quad (1)$$

In Equation (1), $$\begin{bmatrix} H_1 & H_2 & 0 \\ H_1 & 0 & H_2 \end{bmatrix}$$

is referred to as a channel ARQ $H_{ARQ}(t+1)$. As for the retransmitted $X_1(t)$, the detection is possible with high probability due to the combination effect. As for the retransmitted packets $$\begin{bmatrix} X_n(t+1) \\ X_1(t) \end{bmatrix},$$

the channel ARQ is $$\begin{bmatrix} H_1 & H_2 & 0 \\ H_2 & 0 & H_1 \end{bmatrix}.$$

As for the retransmitted packets $$\begin{bmatrix} X_2(t) \\ X_n(t+1) \end{bmatrix},$$

the channel ARQ is $$\begin{bmatrix} H_1 & H_2 & 0 \\ 0 & H_1 & H_2 \end{bmatrix}.$$

As for the retransmitted packets $$\begin{bmatrix} X_n(t+1) \\ X_2(t) \end{bmatrix},$$

the channel ARQ is $$\begin{bmatrix} H_1 & H_2 & 0 \\ 0 & H_2 & H_1 \end{bmatrix}.$$

Next, the receiver checks whether the detection of only one of the three packets is successful in step 505. Namely, the receiver checks whether the error occurs in the remaining two packets. When the detection of only one of the three packets is successful, the receiver eliminates a contribution of the corresponding packet from the combined packets in step 507.

For instance, when $X_1(t)$ is accurately detected from the three packets $$\begin{bmatrix} X_1(t) \\ X_2(t) \\ X_n(t+1) \end{bmatrix},$$

the contribution of $X_1(t)$ is eliminated from Equation (1) as shown in Equation (2).

$$\begin{bmatrix} \underline{Y}_p(t) \\ \underline{Y}(t+1) \end{bmatrix} - \begin{bmatrix} H_1 \\ H_2 \end{bmatrix} \hat{\underline{X}}_1(t) = \begin{bmatrix} H_2 & 0 \\ 0 & H_2 \end{bmatrix} \begin{bmatrix} \underline{X}_2(t) \\ \underline{X}_n(t+1) \end{bmatrix} + \begin{bmatrix} \underline{V}(t) \\ \underline{V}(t+1) \end{bmatrix} \quad (2)$$

In step 509, the receiver stores the remaining two error packets and requests the transmitter to retransmit the two error packets. Next, the receiver terminates the process of the present invention.

When the detection of merely one of the three packets is not successful in step 505, the receiver checks whether the detection of two of the three packets is successful in step 511 (FIG. 5B). That is, the receiver examines whether the error occurs in the remaining packet. When the detection of two of the three packets is accomplished, the receiver eliminates the contribution of the corresponding packet from the combined packets in step 513 and tries to detect the remaining packet in step 515.

Next, the receiver checks whether the detection of the one packet succeeds in step 517. For the successful detection of the one packet, the receiver requests the transmitter to send new packets in step 521. For the detection failure of the one packet, the receiver stores the error packet in a memory and requests the transmitter to send new packets and to retransmit the error packet in step 519. Next, the receiver terminates this process.

When neither one nor two of the three packets is detected in step 511, the receiver examines whether every packet is detected in step 523 (FIG. 5C). At this time, the receiver may succeed or fail in the detection of every packet. When the every packet is detected, the receiver requests the transmitter to send new packets in step 539 and then terminates this process.

When the detection of every packet fails in step 523, the receiver determines the detection failure of every packet. In step 525, the receiver stores the error packets in the memory, rearranges the error packets, and requests the transmitter to retransmit two of the rearranged packets.

Next, the receiver checks whether the retransmitted two packets are received in step 527. Upon receiving the retransmitted packets, the receiver tries to detect the retransmitted packets in step 529. In step 531, the receiver examines whether all of the retransmitted packets are successfully detected. When every retransmitted packet is successfully detected, the receiver applies the detected packets to the original error packets not being rearranged in step 533 and returns to step 513 (FIG. 5B) to eliminate the contribution of the corresponding packets from the combined packets. By contrast, when not every retransmitted packet is detected, the receiver examines whether only one packet is detected in step 535. When only one packet is successfully detected, the receiver applies the detected packet to the original error packets being not rearranged in step 537 and returns to step 507 (FIG. 5A) to eliminate the contribution of the corresponding packet from the combined packets. When not even one packet is detected in step 535, the receiver determines the detection failure of every packet. Hence, in step 525, the receiver stores the error packets, rearranges the error packets, and requests the transmitter to retransmit two of the rearranged packets. Next, the receiver terminates this process.

Figure 6:
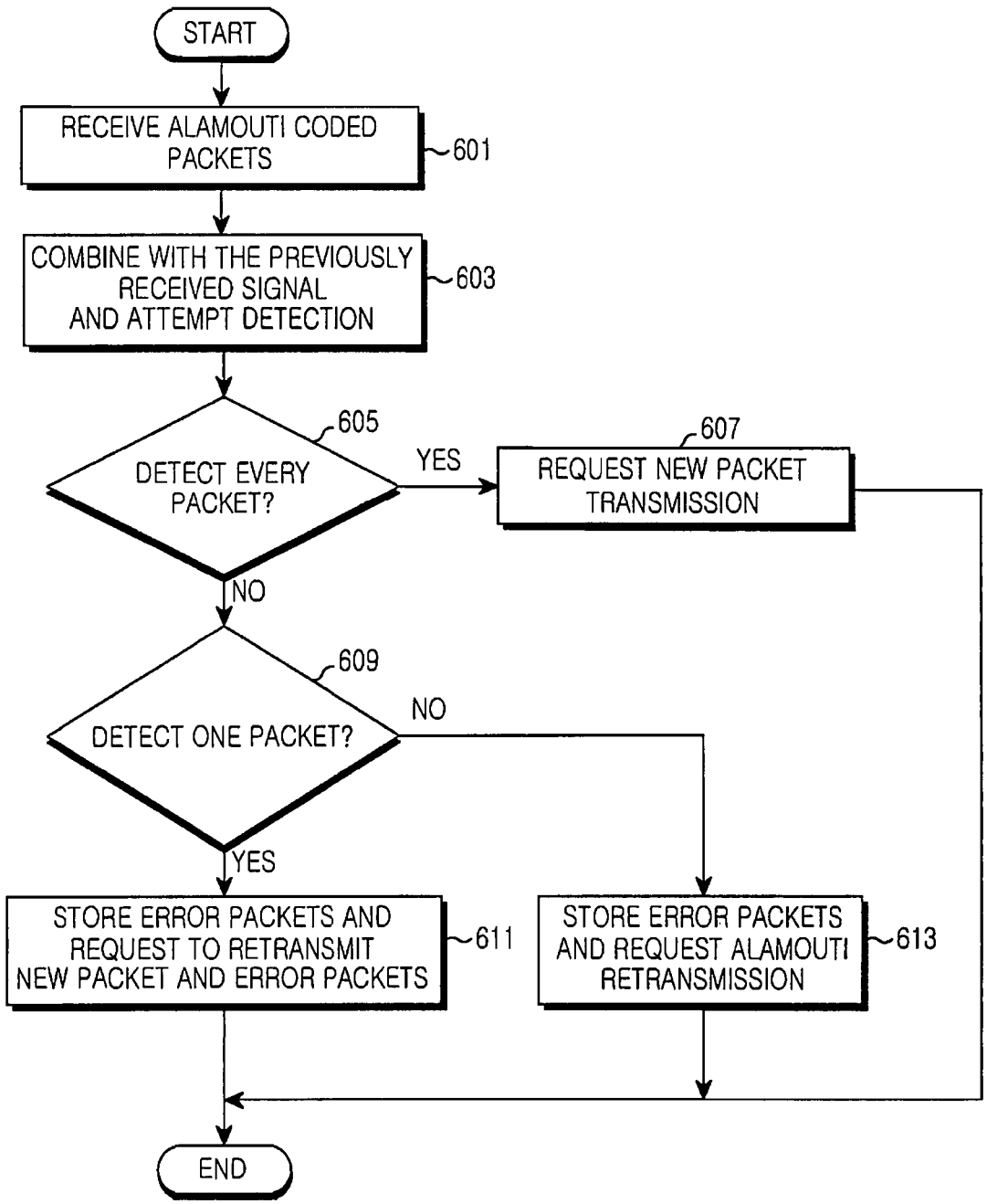
FIG. 6 is a flowchart outlining a signal detection method through the Alamouti retransmission when two packets of a previously received signal are erroneous at the receiver in the MIMO system according to the present invention.

FIG. 6 is a flowchart outlining a signal detection method through the Alamouti retransmission when two packets of a previously received signal are erroneous at the receiver in the MIMO system according to the present invention.

In FIG. 6, the receiver receives Alamouti coded packets from the transmitter in step 601. In step 603, the receiver combines the received Alamouti coded packets with packets received in a previous time slot and tries to detect the combined packets.

For instance, if the error occurs in the detection of the packets $$\begin{bmatrix} X_1(t) \\ X_2(t) \end{bmatrix}$$

received in the previous time slot, the received Alamouti coded packets can be $$\begin{bmatrix} -X_2^*(t) \\ X_1^*(t) \end{bmatrix}.$$

The error packets can be detected by combining the packets received in the previous time slot with the Alamouti coded packets based on Equation (3).

$$\begin{bmatrix} \underline{Y}_p(t) \\ \underline{Y}^*(t+1) \end{bmatrix} = \begin{bmatrix} H_1 & H_2 \\ H_2^* & -H_1^* \end{bmatrix} \begin{bmatrix} X_1(t) \\ X_2(t) \end{bmatrix} + \begin{bmatrix} \underline{V}(t) \\ \underline{V}^*(t+1) \end{bmatrix} \quad (3)$$

In Equation (3), the channel ARQ $H_{ARQ}(t+1)$ is $$\begin{bmatrix} H_1 & H_2 \\ H_2^* & -H_1^* \end{bmatrix}.$$

Next, the receiver checks whether the detection of every packet is successful in step 605. When every packet is successfully detected, the receiver requests the transmission of new packets in step 607 and then terminates this process.

When not every packet is successfully detected, the receiver checks whether only one packet is detected in step 609. When only one packet is detected, the receiver stores the error packets in the memory and requests the transmitter to send new packets and to retransmit the error packets in step 611. When not a single packet is successfully detected; that is, when the detection of all the packets fails, the receiver stores every error packet in the memory and requests the Alamouti retransmission to the transmitter in step 613. Next, the receiver terminates this process.

Meanwhile, in the signal detection method through the retransmission of the error packet when one packet is incorrectly received at the receiver of the MIMO system, the receiver receives new packets and a retransmitted packet for the error packet, rather than the Alamouti coded packets in step 601 and tries to detect the corresponding packets by combining the error packet of the previously received signal and the retransmitted packet in step 603.

For instance, when solely $X_1(t)$ of the packets $$\begin{bmatrix} \underline{X_1}(t) \\ \underline{X_2}(t) \end{bmatrix}$$

received in the previous time slot is successfully detected, the retransmitted packets may be $$\begin{bmatrix} \underline{X_2}(t) \\ \underline{X_n}(t+1) \end{bmatrix} \text{ or } \begin{bmatrix} \underline{X_n}(t+1) \\ \underline{X_2}(t) \end{bmatrix}$$

depending on the antenna selection. Specifically, $X_2(t)$ is retransmitted on the antenna 1 and $X_n(t+1)$ is transmitted on the antenna 2. Alternatively, $X_n(t+1)$ is transmitted on the antenna 1 and $X_2(t)$ is retransmitted on the antenna 2. The corresponding error packet can be detected by combining the packets received in the previous time slot with the retransmitted packet based on Equations (4) and (5).

$$\begin{bmatrix} \underline{Y_p}(t) \\ \underline{Y}(t+1) \end{bmatrix} = \begin{bmatrix} H_2 & 0 \\ H_1 & H_2 \end{bmatrix} \begin{bmatrix} \underline{X_2}(t) \\ \underline{X_n}(t+1) \end{bmatrix} + \begin{bmatrix} \underline{V}(t) \\ \underline{V}(t+1) \end{bmatrix} \quad (4)$$

Equation (4) is an expression for the packet detection when $X_2(t)$ is retransmitted on the antenna 1 and $X_n(t+1)$ is transmitted on the antenna 2. The channel ARQ $H_{ARQ}(t+1)$ is $$\begin{bmatrix} H_2 & 0 \\ H_1 & H_2 \end{bmatrix}.$$

$$\begin{bmatrix} \underline{Y_p}(t) \\ \underline{Y}(t+1) \end{bmatrix} = \begin{bmatrix} 0 & H_2 \\ H_1 & H_2 \end{bmatrix} \begin{bmatrix} \underline{X_n}(t+1) \\ \underline{X_2}(t) \end{bmatrix} + \begin{bmatrix} \underline{V}(t) \\ \underline{V}(t+1) \end{bmatrix} \quad (5)$$

Equation (5) is an expression for the packet detection when $X_n(t+1)$ is transmitted on the antenna 1 and $X_2(t)$ is retransmitted on the antenna 2. The channel ARQ $H_{ARQ}(t+1)$ is $$\begin{bmatrix} 0 & H_2 \\ H_1 & H_2 \end{bmatrix}.$$

There may be several signal retransmission methods available depending on the antenna selection, and the receiver can request the retransmission by selecting the transmission path on a certain basis. The retransmission basis for the selection includes blind switching, Channel State Indicator (CSI) based antenna selection, and memory-less antenna selection.

When one of two packets is erroneous and the packets are transmitted in the previous time slot via an antenna i, the blind switching requests retransmission on another antenna j (i≠j). When both of two packets are incorrectly received, the blind switching requests the Alamouti retransmission.

The CSI based antenna selection sets a retransmission basis according to the performance of a receive equalizer which restores the distorted transmit signal. In more detail, an estimated error probability of the corresponding packet is calculated according to the error probability of a specific packet and the retransmission packet of highest priority is sent by minimizing an average error variance of two streams, by minimizing a minimum error variance of two streams, or by minimizing a maximum error variance of two streams.

The memory-less antenna selection sends a retransmission packet of highest priority in a path under the best or worst channel condition depending on Signal to Noise Ratio (SNR) or CSI. When the hightest priority retransmission packet is sent in the path under the worst channel condition, the detection probability of the retransmitted packet can slightly increase and other packets over other paths can be detected with high probability.

As set forth above, when the detection error is generated at the received signal in the MIMO system, the ARQ apparatus and method requests the retransmission of the corresponding error packet based on the number of data flows suffering the detection error and the antenna selected for the retransmission. Therefore, the error rate of the retransmitted data can be minimized, the number of retransmissions can be decreased, and the overall data transmission rate can be raised.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An Automatic Repeat reQuest (ARQ) method of a receiver in a Multiple Input Multiple Output (MIMO) system which transmits two or more M-ary coded packets at the same time, the method comprising:
   decoding, when one or more packets are received, the received packets and trying to detect the decoded packets; and
   storing, when error is detected from the packets, the corresponding error packet, requesting a transmitter to retransmit N-ary packets from which the error is detected and to transmit (M-N)-ary new packets when the number of the error packets N is smaller than the total number of the transmitted packets M.

2. The ARQ method of claim 1, wherein the N-ary error packets are requested to be retransmitted on N-ary retransmit antennas, and the new (M-N)-ary packets are requested to be transmitted on other antennas.

3. The ARQ method of claim 1, further comprising:
   requesting space-time coding and retransmission of the M-ary packets when the number of the error packets is equal to the total number of the transmitted packets M.

4. The ARQ method of claim 3, wherein the M-ary packets to be retransmitted are Alamouti coded packets of packets transmitted in a previous time slot.

5. The ARQ method of claim 1, further comprising:
   when the number of the error packets is equal to the total number of the transmitted packets M, selecting the N-ary retransmit antennas, where N is smaller than M, requesting retransmission N-ary packets of the error packets on the selected retransmit antennas, and requesting transmission of (M-N)-ary new packets on other antennas.

6. The ARQ method of claim 1, further comprising:
   receiving the new packets and the retransmitted packets and trying to detect a received signal by combining the received packets with the stored error packets; and
   when the signal is successfully detected, eliminating a contribution of the corresponding signal from the combined packets.

7. The ARQ method of claim 6, further comprising:
   when no signal is successfully detected, storing the corresponding error packets, rearranging the corresponding error packets, and requesting retransmission some of the rearranged packets;
   receiving retransmitted packets and trying to detect the retransmitted packets; and
   when the detection of the retransmitted packets succeeds, applying the retransmitted packets to the original error packets not being rearranged, and eliminating a contribution of the corresponding signal from the combined packets.

8. The ARQ method of claim 7, further comprising:
   trying to detect the remaining packets from which the contribution is eliminated; and
   requesting transmission of new packets when the detection of the remaining packets is successful, and storing the corresponding error packets and requesting retransmission of the corresponding error packets and transmission of new packets when the detection of the remaining packets fails.

9. The ARQ method of claim 7, further comprising:
   storing the corresponding error packets and requesting retransmission of the corresponding error packets.

10. The ARQ method of claim 7, wherein, when the detection of the retransmitted packets fails, the corresponding error packets are stored and rearranged, retransmission of some of the rearranged packets is requested, the retransmitted packets are received, and the detection of the retransmitted packets is repeatedly attempted.

11. The ARQ method of claim 3, further comprising:
    receiving the retransmitted packets and trying to detect a received signal by combining the received packets with the stored error packets.

12. The ARQ method of claim 11, further comprising:
    when the number of the error packets N is smaller than the total number of the transmitted packets M, requesting retransmission of the N-ary error packets and transmission (M-N)-ary new packets; and
    when the number of the error packets is equal to the total number of the transmitted packets M, requesting space-time coding and retransmission of the M-ary packets.

13. A receiver for Automatic Repeat reQuest (ARQ) in a Multiple Input Multiple Output (MIMO) system comprising:
    means for decoding, when one or more packets are received, the received packets and detecting the decoded packets; and
    means for storing, when error is detected from the packets, the corresponding error packet, requesting a transmitter to retransmit N-ary packets from which the error is detected and to transmit (M-N)-ary new packets when the number of the error packets N is smaller than the total number of the transmitted packets M.

14. The receiver of claim 13, wherein the N-ary error packets are requested to be retransmitted on N-ary retransmit antennas selected by the receiver, and the new (M-N)-ary packets are requested to be transmitted on other antennas.

15. The receiver of claim 13, further comprising:
    means for requesting space-time coding and retransmission of the M-ary packets when the number of the error packets is equal to the total number of the transmitted packets M.

16. The receiver of claim 15, wherein the M-ary packets to be retransmitted are Alamouti coded packets of packets transmitted in a previous time slot.

17. The receiver of claim 16, further comprising:
    means for, when the number of the error packets is equal to the total number of the transmitted packets M, selecting the N-ary retransmit antennas, where N is smaller than M, and for requesting retransmission N-ary packets of the error packets on the selected retransmit antennas, and requesting transmission of (M-N)-ary new packets on other antennas.

* * * * *